Patented Mar. 11, 1947

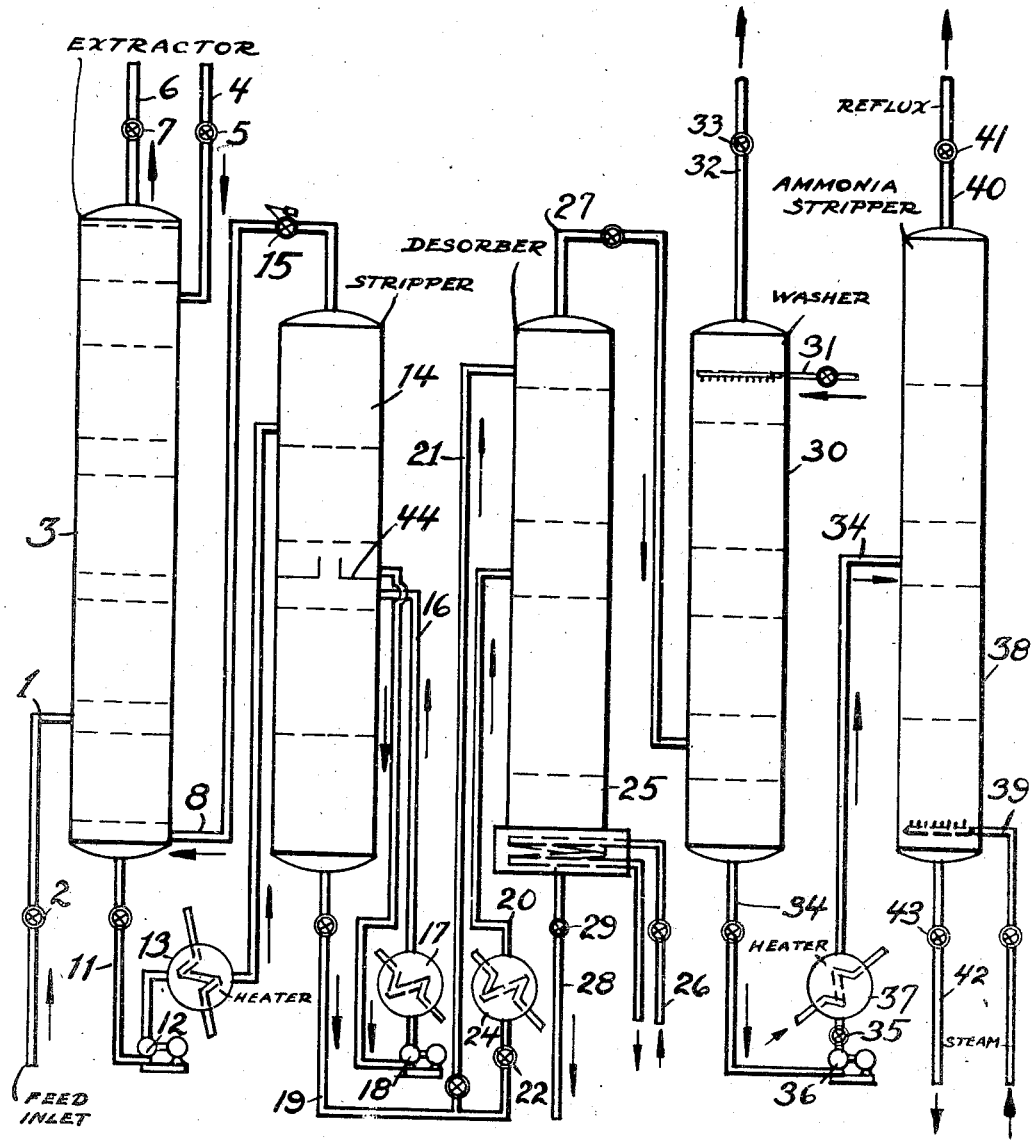

2,417,048

UNITED STATES PATENT OFFICE 2,417,048

SEPARATION AND SEGREGATION OF A MATERIAL FROM A LIQUID MIXTURE BY MEANS OF A SOLVENT

Adolph L. Antonio, Baton Rouge, La., assignor, by mesne assignments, to Jasco, Incorporated, a corporation of Louisiana Application February 27, 1942, Serial No. 432,618

5 Claims. (Cl. 260—681.5)

This invention relates to improvements in the separation and concentration of a material from a hydrocarbon mixture which is normally gaseous by the use of a solvent in which solvent at least two of the materials in the hydrocarbon mixture are soluble.

Solvents have been used heretofore to separate and extract a material from hydrocarbon mixtures but where two or more materials are soluble and extracted in the same solvent, it has been the practice heretofore to obtain the separation of the desired material by using a mixture of solvents to separate the said material from the hydrocarbon mixture. The difficulties heretofore in this process were that there always was some of the undesirable material separated along with the desired material.

For the sake of illustration and not as a limitation, an extraction of butadiene 1,3 from a fraction of mixed hydrocarbons is herewith described by the use of an aqueous solution of cuprous acetate, ammonium acetate, and excess ammonia as the solvent. The rich copper solution obtained by contacting the solvent with the mixed hydrocarbon feed contains a considerable percentage of butenes together with the butadiene. The percentage of butenes varies depending upon the percentage of butenes in the feed stock. From a feed stock containing 30% butadiene and 70% butenes, the rich copper solution obtained by contacting the copper solution therewith, will contain from 5 to 10% of butenes based on the total hydrocarbons in the copper solution.

An object of this invention is to provide improvements in the solvent extraction of a specific material from a mixture of materials that are likewise soluble in a different degree in the said solvent in order that a substantially pure or 98% to 100% concentration of the desired material is obtained.

Another object of this invention is to obtain a substantially 100% yield in the separation and concentration of the desired material.

These and other objects of the invention will be understood by reading the following description with reference to the diagrammatical flow sheet.

According to this invention, butadiene in a high state of purity is obtained from a mixture of butadiene, butane, butene-1, butene-2 and iso-butylene. The hydrocarbon mixture is first condensed and the liquid hydrocarbon mixture passed through pipe 1 provided with valve 2 to the lower part of extractor 3. A solution of cuprous acetate, ammonium acetate and excess ammonia is introduced into upper part of extractor 3 through pipe 4 provided with valve 5. The liquid hydrocarbon mixture and the copper solution pass in counter-current flow to each other in extractor 3. This is preferably carried out at as low a temperature as possible without freezing the copper solution, that is, not below —5° F. The hydrocarbon mixture, after being contacted with the copper solution, is removed from the top of the extractor 3 by means of pipe 6 provided with valve 7. It may be heat exchanged with the feed and washed with water for the removal of entrained and soluble ammonia.

The rich copper solution below the point where the feed is passed into the extractor 3 is contacted with recycle hydrocarbon liberated in a stripper 14 and introduced into the bottom of extractor 3 by means of pipe 8. The temperature in the bottom of extractor 3 is maintained at about 20° F. The copper solution is withdrawn from the extractor 3 by means of pipe 11, provided with pump 12 and heater 13. The rich copper solution is heated to a temperature preferably in the range from about 55° to 65° F. at a pressure high enough to keep the hydrocarbons in a liquid phase and is introduced into stripper 14. Butenes and some butadiene are rejected from this solution and passed through pipe 8 which is also provided with pressure release valve 15 and returned to the lower part of the extractor 3. The copper solution introduced in the upper part of the stripper 14 by pipe 11 flows downward in the stripper 14 in counter-current flow to hydrocarbons rejected in the bottom of the stripper 14. Some of the butadiene is absorbed by the copper solution displacing the butenes due to preferential absorption, thereby effecting an increase in the ratio of butadiene to butenes associated with the copper solution phase. A portion or all of the copper solution may be withdrawn from plate 44 through pipe 16, heated to 65° to 85° F. by means of heater 17, and returned by means of pump 18 to the stripper 14 below plate 44. The settled and disengaged copper solution in the bottom of this stripper will contain essentially butadiene of 98 to 100% purity. The purity of the butadiene in the copper solution removed from the extractor 3 will normally be in the range of 90 to 95%.

The copper solution leaving stripper 14 is then passed by means of pipes 19, 20 and 21 provided with valves 22 and 23, and heater 24, to the desorber 25. A part of this stream may be heated in the heater 24 and passed to the middle of the desorber 25. A portion of the solution is passed to the upper part of the desorber 25 through the line 21. The solution is heated to a temperature of about 150° to 180° F. by means of a steam coil 26 in the lower part of the desorber 25 and the desorbed hydrocarbons are removed through pipe 27. The copper solution relatively free of hydrocarbons is removed through line 28 provided with valve 29 and may be recycled after being reforti"d if necessary to extractor 9.

The butadiene vapors removed from desorber 25 through pipe 27 are passed through washer 30 where water is provided through pipe 31 to scrub out the ammonia. The butadiene vapors are removed through pipe 32 provided with valve 33 and passed to storage (not shown). The water used for scrubbing the butadiene is passed through pipe 34, provided with valve 35, pump 36 and heater 37 into an ammonia stripper 38 where it is heated by means of direct steam, introduced through pipe 39 and the overhead vapors are passed through pipe 40 to recover ammonia of 95 to 100% concentration and 5 to 0% water. This ammonia may be used to fortify the cuprous solution and maintain the desired concentration. The water is removed through pipe 42 provided with valve 43.

Alternately the absorption and stripping may be carried out in one tower by maintaining the temperature in the lower part of the tower sufficiently high to partially strip the rich copper solution of a part of the solutes as it passes through the lower part of the tower, the liquid diolefins being then reabsorbed as they pass in countercurrent flow to the copper solution.

Likewise a part of the diolefins obtained from the desorber may be liquefied and recycled to the lower part of the stripper. When the diolefins are used in the manufacture of rubber, a portion in time accumulates such a concentration of impurities that they are no longer suitable for the manufacture of rubber. These impure portions of the diolefins may be purified by passing into the stripper or the absorber.

In order to illustrate the process, packed towers are shown but other towers provided with plates, bell caps, etc., may be used.

Turbo mixers with intervening settling chambers may likewise be used in absorption of the diolefins with the copper solution and by changing the temperature and pressure, the turbo mixers with intervening settling chamber may also be used to fractionally separate the diolefins from the copper solution.

I claim:
1. A process for the separation and segregation of a diolefin from a hydrocarbon mixture containing a diolefin and a mono-olefin which comprises contacting a mixture of hydrocarbons containing a diolefin and a mono-olefin with a cuprous salt solution in which the diolefin is more soluble than the mono-olefin at an absorption temperature whereby diolefins and mono-olefins are dissolved in the solvent, separating the solvent with absorbed diolefin and mono-olefin in solution from the unabsorbed hydrocarbons, subjecting the solution comprising the solvent with the absorbed diolefin and mono-olefin to a series of two progressively increased temperature heating steps under pressure, expelling liquid hydrocarbon during each step, returning the first expelled hydrocarbon to the contacting operation to strip the solution first obtained and separated after contacting the mixture of hydrocarbons containing the diolefin and mono-olefin, conducting the second expelled hydrocarbon into contact with the solution just before heating in the second step to strip it and finally heating the residual solution to obtain diolefin.

2. A process for the separation and segregation of a diolefin from a hydrocarbon mixture containing a diolefin and a mono-olefin according to claim 1 in which the contacting temperature for contacting the solvent with the mixture of gases is not below −5° F.

3. A process for the separation and segregation of a diolefin from a hydrocarbon mixture containing a diolefin and a mono-olefin according to claim 1 in which the first temperature in the first heating step is 55°–65° F.

4. A process for the separation and segregation of a diolefin from a hydrocarbon mixture containing a diolefin and a mono-olefin according to claim 1 in which the temperature in the second heating step ranges from about 65° to 85° F.

5. A process for the separation and segregation of a diolefin from a hydrocarbon mixture containing a diolefin and a mono-olefin according to claim 1 in which the cuprous salt solution is a solution of cuprous acetate, ammonium acetate and an excess of ammonia.

ADOLPH L. ANTONIO.

REFERENCES CITED

The following references are of record in the file of this patent:

UNITED STATES PATENTS

| Number | Name | Date |
|---|---|---|
| 2,154,676 | Haeuber et al. | Apr. 18, 1939 |
| 1,977,659 | Watts | Oct. 23, 1934 |
| 2,275,135 | Fasce | Mar. 3, 1942 |
| 2,188,899 | Hebbard et al. | Feb. 6, 1940 |

FOREIGN PATENTS

| Number | Country | Date |
|---|---|---|
| 390,863 | Britain | Apr. 13, 1933 |

OTHER REFERENCES

Lur'e et al., Sinteticheskii Kauchuk, No. 6 19–29, (1934).